United States Patent [19]

Huizing et al.

[11] Patent Number: 4,763,398
[45] Date of Patent: Aug. 16, 1988

[54] METHOD OF MANUFACTURING A LIGHT CONDUCTOR AND HOLLOW METAL LIGHT CONDUCTOR MANUFACTURED ACCORDING TO THE METHOD

[75] Inventors: Albert Huizing, Eindhoven; Willy J. B. Felder, Bocholtz; Antonius W. Tijssen, Eindhoven, all of Netherlands

[73] Assignee: U.S. Philips Corporation, New York, N.Y.

[21] Appl. No.: 905,227

[22] Filed: Sep. 8, 1986

[30] Foreign Application Priority Data

Sep. 11, 1985 [NL] Netherlands .......... 8502477

[51] Int. Cl.$^4$ .......................................... G02B 6/20
[52] U.S. Cl. ................... 29/527.1; 29/423; 29/424; 29/527.2; 350/96.1; 350/96.34; 350/320
[58] Field of Search ............. 29/423, 424, 527.1, 29/527.2, 557, DIG. 2, DIG. 12, DIG. 25; 250/277; 350/96.1, 96.25, 96.28, 96.34

[56] References Cited

U.S. PATENT DOCUMENTS

| 3,314,130 | 4/1967 | Sheridan | 29/424 X |
| 4,453,803 | 6/1984 | Hidaka et al. | 350/96.34 X |
| 4,652,083 | 3/1987 | Laakmann | 350/96.34 X |
| 4,669,821 | 6/1987 | Blair et al. | 350/96.34 |
| 4,688,892 | 8/1987 | Laakmann | 350/96.34 X |
| 4,688,893 | 8/1987 | Laakmann | 350/96.34 X |

*Primary Examiner*—Howard N. Goldberg
*Assistant Examiner*—Taylor J. Ross
*Attorney, Agent, or Firm*—Paul R. Miller

[57] ABSTRACT

The invention provides a method of manufacturing a hollow metal light conductor in which at least one metal layer is provided on a core of a synthetic resin material, for example, polymethylmethacrylate, after which the core is removed, and a metal tube is formed. The core is preferably removed by slightly elongating the core so that the cross-section is reduced, after which the metal light conductor can be pulled from the core. The reflecting metal layer on the inside surface of the light conductor preferably is of aluminium. The invention provides a hollow metal light conductor, for example, for use in an optical spectrometer, which is also suitable in particular to be used for light having a short wavelength, to less than 200 nm.

8 Claims, 1 Drawing Sheet

METHOD OF MANUFACTURING A LIGHT CONDUCTOR AND HOLLOW METAL LIGHT CONDUCTOR MANUFACTURED ACCORDING TO THE METHOD

The invention relates to a method of manufacturing a light conductor comprising a tube having on its inside surface a reflecting metal layer.

The invention also relates to a hollow metal light conductor manufactured according to the method.

BACKGROUND OF THE INVENTION

A hollow light conductor has the advantage over a light conductor of glass or a synthetic resin that light of a short wavelength can be transported. The limit of the applicability of a glass fibre lies approximately at a wavelength of 280 nm as a result of absorption of the light at shorter wavelengths. A hollow light conductor is suitable, for example, for use in an optical spectrometer, for example, between a grating and a detector. Compared with the use of mirrors, the possibility of damage or pollution is reduced, space is saved and the alignment is considerably simplified.

A hollow light conductor and a method of manufacturing same are disclosed, for example, in the published German patent application DE No. 2452600. In this method, a tube is formed from glass or a synthetic resin, for example by extrusion, after which a metal wire is evaporated in the tube by high frequency heating, a metal layer being formed on the inside of the tube. The tube has an inside diameter from a few $\mu$m to a few mm. When a glass tube is used the disadvantage occurs that a light conductor having a large diameter is not very flexible. If a tube from a synthetic resin material is used, the mechanical strength and the resistance to ambient influences, especially after a long period of time, are unsatisfactory for many applications.

SUMMARY OF THE INVENTION

It is an object of the invention to provide a light conductor and a method of manufacturing same, which light conductor is suitable for use in the wavelength range from 165 nm to more than 1000 nm, which light conductor is flexible and in which the shape and dimensions can freely be chosen within wide limits, both as regards the length and the cross-section. Another object of the invention is to provide a light conductor having a sufficient mechanical strength and a low loss of light, in which the loss of light must be small after a long period in use.

According to the invention, the object of providing a method of manufacturing a light conductor is achieved by a method as described in the opening paragraph which is characterized in that at least one metal layer is provided on a core of a synthetic resin material, after which the core of synthetic resin material is removed, and a metal tube is formed.

In a light conductor which has been manufactured according to this method, the reflection of the inside of the metal tube depends on the quality of the surface of the core used. The core must therefore show as few scratches and irregularities as possible. An advantage of the method is the fact that the provided metal layer or metal layers need not show a smooth outer surface so that a wide choice is possible from various methods of deposition, and it is possible to adapt the methods to the requirements which are imposed, for example, on the mechanical properties of the light conductor.

Within the scope of the invention it is also possible to provide one or more layers of other materials, for example of a synthetic resin material, on the reflecting metal layer.

In a preferred embodiment of the method according to the invention the core of synthetic resin after providing the metal layer(s) is elongated while reducing the cross-section, after which the core is pulled out of the metal tube. The property of many synthetic resins is used in which an imposed change in dimension in one direction causes a fully or partly compensating change in dimension in the directions at right angles thereto, the overall volume remaining substantially constant. In particular isotropic synthetic resins, for example having a Poisson's ratio $\nu = \frac{1}{2}$, are suitable for use in the method according to to the invention. It is further desired that the bonding of the reflecting metal layer to the surface of the core of synthetic resin is low. For that purpose it will generally suffice not to use the conventional measures improving the bonding.

In an alternative embodiment of the method according to the invention the core of synthetic resin after providing the metal layer(s) is removed by dissolving the core in a suitable solvent.

In a particularly favourable embodiment of the method in accordance with the invention the core is formed from polymethylmethacrylate. This synthetic resin has suitable mechanical properties and can be manufactured with an optically smooth surface. The Poisson's ratio $\nu$ is $\frac{1}{3}$. Suitable solvents are, for example, methylene chloride, acetone, butyl acetate, chloroform, dimethylformamide and dimethylsulphoxide.

In order to obtain a light conductor having a good reflection with short wavelengths of the light, for example to less than 200 nm, it is efficacious that a layer of aluminium is provided as the first layer in the method according to the invention. Aluminium shows a reflection of approximately 40% at a wavelength of 200 nm, while other materials, for example silver and gold, at that wavelength show a reflection of less than 20%. Moreover, silver has the disadvantage of corrosion in air so that reflection decreases in the course of time, also at longer wavelengths.

The light conductor manufactured by means of the method according to the invention can show various suitable shapes as regards cross-section, for example circular or elliptical.

In a particular embodiment of the light conductor according to the invention the internal cross-section of the light conductor is rectangular. This has for its advantage that the strip of a synthetic resin which is used as a core in the manufacture may show optically very smooth surfaces, for example, because a flat strip can readily be machined. In a light conductor having a rectangular cross-section the reflection in particular at the inner surfaces of the tube which engage the long sides of the rectangle is of importance.

In a preferred form of the light conductor according to the invention the reflecting metal layer is an aluminium layer on which a supporting layer of copper is provided with at least a layer of nickel being present between the aluminium layer and the copper layer.

BRIEF DESCRIPTION OF THE DRAWINGS

An embodiment of the method and the light conductor according to the invention will be described in greater detail with reference to the drawing, in which.

DESCRIPTION OF THE INVENTION

Example

Figure 1A:
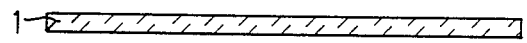
FIGS. 1a through 1l are longitudinal and cross-sectional views (not to scale) of the light conductor and the core of a synthetic resin material in a number of steps of the method according to the invention.
Figure 1B:
Figure 1C:
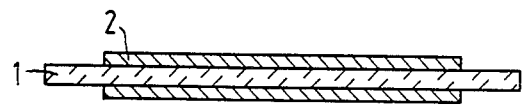
Figure 1D:
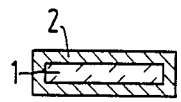
Figure 1E:
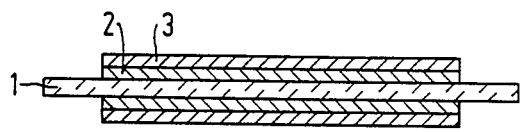
Figure 1F:
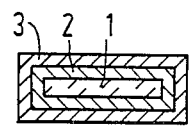

A strip 1 having a length of 300 mm, a width of 14 mm and a thickness of 1.5 mm, see FIGS. 1a, b, is sawed from a plate of extruded polymethylmethacrylate having an optically smooth surface. The strip may also be manufactured in a different manner, for example, by breaking. A layer of aluminium 2 is provided on all sides on the strip 1 in a thickness of 150 nm by magnetron sputtering in a vacuum, the ends of the strip not being covered, see FIGS. 1c, d. The temperature during sputtering is kept below 60° C. Magnetron sputtering is a method known per se in which aluminium can be provided on polymethylmethacrylate with low bonding. A layer of nickel 3 in a thickness of 100 nm is then provided on the layer of aluminium 2 also by magnetron sputtering, after which the strip is removed from the vacuum, see FIGS. 1e, f.

Figure 1G:
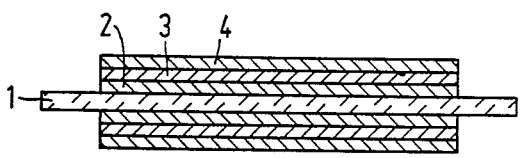
Figure 1H:
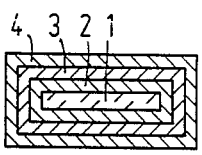
Figure 1I:
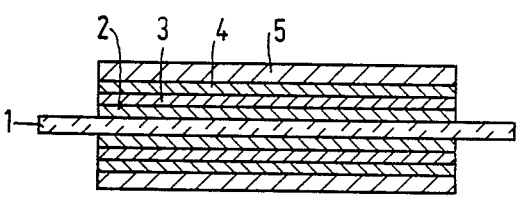
Figure 1J:
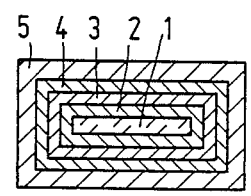
Figure 1K:
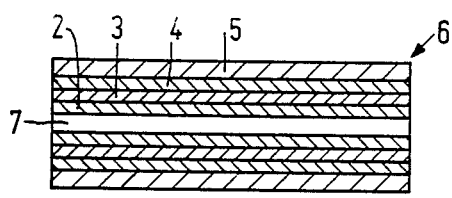
Figure 1L:
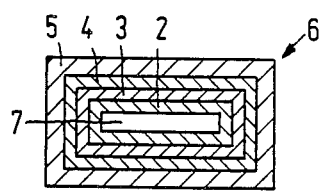

The nickel layer 3 is reinforced galvanically with a subsequent nickel layer 4 in a thickness of 5 μm, see FIGS. 1g, h. For this purpose, a Watts nickel plating bath is used with a current density of 2 A/dm$^2$. A layer of copper 5 in a thickness of 400 μm is deposited on the nickel layer 4, see FIGS. 1, i, j. The thickness of the copper layer 5 may be smaller or larger, if so desired, for example from 200 to 500 μm. A galvanic copper plating bath is used to manufacture a flexible copper layer 5. For this purpose a copper bath is used which comprises an acid copper sulphate solution, with a current density of 5 A/dm$^2$. It is possible to provide even more layers, for example, a thin layer of chromium, for decorative reasons.

The layer of aluminium 2 ensures a good reflection. The first nickel layer 3 insures that the aluminium layer 2 is not oxidised when the strip is removed from the vacuum. The bonding to the following metal layers would be adversely influenced by oxidation. The second nickel layer 4 serves to present diffusion of copper in the aluminium, which would cause a reduced reflection. The copper layer 5 serves as a support for the light conductor.

The non-covered ends of the strip 1 are connected in a strength testing machine, after which the strip is elongated (elongation, for example, 1% of the original length). A permanent plastic deformation occurs. The light conductor 6 may then be slid from the strip 1 (see FIGS. 1k, l). In order to facilitate this it is possible to give the strip 1 a slightly conical shape. Light having a wavelength from 165 nm to more than 1000 nm can be transported via the resulting cavity 7 in the light conductor 6. The reflection at the aluminium surface approaches that of an ideal smooth aluminium surface. After ageing for six months the aluminium still shows a reflection of at least 95% at a wavelength of 400 nm.

The light conductor 6 is sufficiently flexible to be given the desired shape, for example, by bending. In order to prevent the formation of a kink it is efficacious to roll the light conductor over a cylinder during bending. If it is necessary to further increase the flexibility of the light conductor this can be achieved by heating the light conductor, for example, to a temperature of 300° C.

The method according to the invention is particularly suitable for the manufacture of light conductors for use in an optical spectrometer in which a restricted flexibility is desired. A particular advantage of the method is the possibility of adapting length and cross-section of the light conductor in a simple manner to the sizes desired for the application, as a result of which the method can also be used for the manufacture of small numbers of light conductors of a given shape and dimension with a great efficiency.

What is claimed is:

1. A method of manufacturing a light conductor comprising the steps of
   providing a core of a synthetic resin material,
   forming at least one metal layer on said core,
   elongating said core to reduce the cross-section of said core, and
   removing said core from said at least one metal layer to form a metal tube, wherein said metal tube has an inside surface being a reflecting metal surface.

2. A method of manufacturing a light conductor comprising the steps of
   providing a core of a synthetic resin material,
   forming at least one metal layer on said core,
   removing said core from said at least one metal layer to form a metal tube by dissolving said core in a suitable solvent, wherein said metal tube has an inside surface being a reflecting metal surface.

3. A method according to claim 1 or claim 2, wherein said core is formed from polymethylmethacrylate.

4. A method according to claim 1 or claim 2, wherein said at least one metal layer is formed of aluminum.

5. A method according to claim 1 or claim 2, wherein said metal tube is formed with a rectangular internal cross-section.

6. A method according to claim 5, wherein said metal tube is formed of an aluminum layer being said reflecting metal surface, at least one intermediate nickel layer, and a supporting layer of copper.

7. A hollow metal light conductor comprising a hollow metal tube having an inner reflecting metal surface, said metal tube having a rectangular internal cross-section, said inner reflecting metal surface being an aluminum layer wherein said metal tube includes a supporting layer of copper.

8. A hollow metal light conductor according to claim 7, wherein at least a layer of nickel is disposed between said supporting layer and said inner reflecting metal surface.

* * * * *